United States Patent [19]
Hallerback

[11] 3,740,598
[45] June 19, 1973

[54] ELECTRIC MOTORS OR OTHER ELECTRIC ROTARY MACHINES AND METHOD FOR THE MANUFACTURE THEREOF

[75] Inventor: Stig Lennart Hallerback, Vastra Frolunda, Sweden

[73] Assignee: SKF Industrial Trading and Development Company N.V., Amsterdam, Netherlands

[22] Filed: Nov. 1, 1971

[21] Appl. No.: 194,374

[30] Foreign Application Priority Data
Nov. 2, 1970 Sweden .................... 14729/70

[52] U.S. Cl ............................ 310/86, 310/89, 310/90
[51] Int. Cl. ..................................... H02k 5/10
[58] Field of Search .......... 310/86, 85, 87, 89, 90, 91

[56] References Cited
UNITED STATES PATENTS

| | | | |
|---|---|---|---|
| 3,229,130 | 1/1966 | Drouard | 310/86 |
| 3,192,861 | 7/1965 | Haegh | 310/86 |
| 2,039,456 | 5/1936 | Sammarone | 310/90 UX |
| 1,543,502 | 5/1936 | Hobart | 310/86 |
| 2,734,459 | 2/1956 | Zimsky | 310/86 |

*Primary Examiner*—R. Skudy
*Attorney*—Dexter N. Shaw, Howson & Howson

[57] ABSTRACT

An electric motor or other electric rotary machine comprising bearing support means of cup-like shape mounted to the stator radially inside the stator end windings is provided with a thin walled lining fitting closely in the stator bore and projecting slightly from the stator end face. The projecting lining portion serves as abutment and aligning means for the 7 cup-like bearing support without having to take up mechanical loads. The lining blanks off the stator bore against bonding agents or molding compounds employed for joining the bearing support means to the stator and for embedding and insulating the stator windings in the stator slots.

3 Claims, 6 Drawing Figures

Patented June 19, 1973 3,740,598

ELECTRIC MOTORS OR OTHER ELECTRIC ROTARY MACHINES AND METHOD FOR THE MANUFACTURE THEREOF

The present invention relates to electric motors or other electric rotary machines, comprising a stator, a rotor and bearing support means in the shape of a cup-shaped member attached at its larger end to the stator end face radially inside the end windings of the stator as by bonding or moulding and supporting at its smaller end a rotor bearing.

An electric machine, e.g. an electric motor, which is built with the bearing support means of the rotor assembly attached to the stator end face radially inside the end windings of the stator, offers substantial advantages. Silent operation, small dimensions and a low cost of production, as compared with conventionally built motors, can be obtained. Due to the fact that the central bore of the stator is employed for positioning the bearing assemblies, the long chain of tolerances over end shields, stator mantle and stator core produced in conventionally built motors, can be eliminated, this making for smaller variations in measurements. By that reason consistently silent running motors can be built on a mass-production basis, and the variation in performance between motors will be smoothed out. It is imperative, however, for achieving these results that an accurate alignment of the bearing and the stator bore is obtained. This also means, of course, that a radial plane of the bearing shall be at right angles to the rotor shaft axis. Besides, a rigid fixation of the bearing support means to the stator proper is required.

The most difficult part in building machines comprising the aforesaid favorable bearing arrangements is, however, usually, on one hand that an extremely restricted space is available at the end faces of the stator inside the end windings for the centering and fixation of the bearing support in the axial as well as the radial direction, and on the other hand that the end faces of a conventional stator assembled of punched plates do not afford a suitable support radially inside the end windings for the alignment and fixation of the bearing support. A mechanical joint, employing screws or the like, between the stator core and the bearing support, is virtually out of the question save in special cases. Some form of bonding or fixation by moulding of the bearing support is practically the only solution. In this kind of operation, however, glue or moulding compound might penetrate into the stator bore through the slots of the stator core provided for the stator windings and opening into the stator bore.

In an electric motor whereof the bearing support means for the rotor assembly are disposed radially inside of the end windings of the stator, the problem of getting the bearings accurately aligned with the axis of the rotor cavity of the stator and with their radial planes normal to the rotor shaft axis can be solved by initially moulding centering and abutment areas with the aid of suitably shaped and dimensioned mandrels. These mandrels beyond acting as mould parts prevent moulding compound from penetrating into and obstructing the rotor cavity of the stator.

When such a method is practised, an additional bonding or moulding operation in connection with the assembly of the rotor and the bearing is required, to finally join together the motor parts. These repeated bonding or molding operations mean a complication of the manufacture as well as an increase in cost.

To overcome these problems and drawbacks in the manufacture of electric motors and other electric rotary machines, the cylindrical rotor cavity of the stator core is provided with a thin-walled lining of non-magnetic material which extends slightly beyond the end face of the stator thereby affording a centering surface concentrical with the rotor cavity of the stator and an axial abutment surface at right angles to the former, for accurate, non-supporting positioning of the bearing support means and simultaneously blanking off the openings of the stator slots against the penetration of bonding cement, resin or molding compound into the rotor cavity of the stator when joining together the bearing support means and the stator with the rotor positioned in the stator bore.

The invention further provides a method of manufacturing an electric motor or other electric rotary machine. According to this method, a stator complete with stator windings is manufactured, a closely-fitting, thin-walled lining of a non-magnetic material is mounted in the rotor cavity of the stator so as to extend somewhat beyond the end face of the stator, and bearing support means with bearing means mounted therein and supporting a rotor is mounted with its large end facing and engaging the said lining so as to have its radial and axial position determined thereby, the bearing support means being fixed in this position by bonding.

Since only the last manufacturing step involves a molding operation, this method of manufacture readily lends itself to automation.

The invention will be described more in detail hereinafter with reference to the drawings which illustrate somewhat diagrammatically embodiments of electric motors according to the invention.

Figure 1:
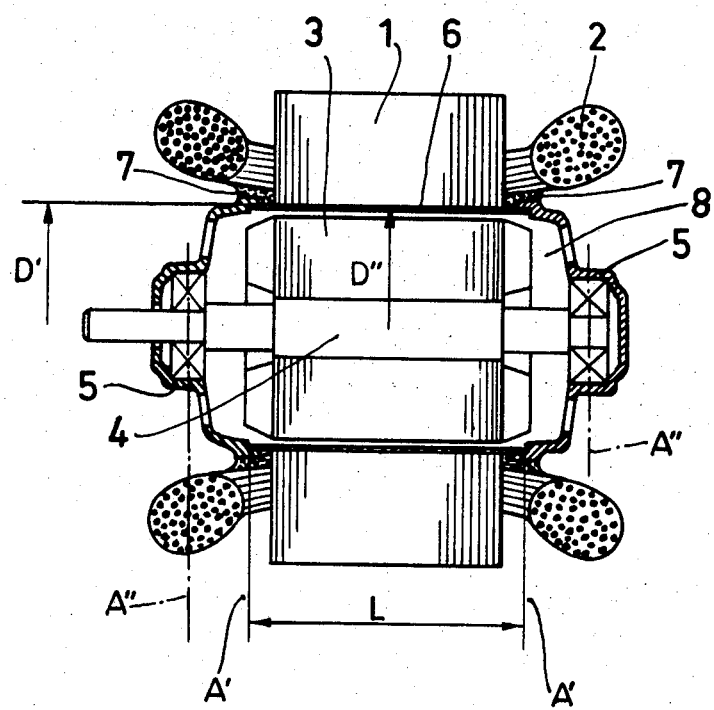
FIG. 1 is a longitudinal section view of an electric motor, built according to the principles of the invention.

FIG. 1 shows a longitudinal section view through an electric motor, of which the stator 1 is provided with the windings 2. The rotor 3 with the shaft 4 is supported by two cup-shaped bearing supports 5, provided with rotor bearings. The radially and axially accurately determined positioning of these bearing supports is relation to the stator bore has been obtained by engagement of their larger end with a thin-walled cylindrical lining member 6 that has been inserted into the stator bore with a close fit, the length L of the lining being somewhat greater than the distance between the stator end faces, whereby the lining extends by a small measure beyond the stator.

Provided that the bearing supports are precision-made, a very good concentricity is obtained at the assembly of the motor between the rotor shaft 4 in the bearing supports 5 having the centering areas D' and the bore D" of the stator, as well as an accurate parallelism between the plane A' at right angles to the rotor shaft axis and the radial planes A'' of the rotor bearings. The length of lining 6 which can be readily manufactured to close length tolerances, determines the interspacing of the bearings, and moderate variations in length of the stator do not influence the total length of the assembly, since the end faces of the stator are not used as abutment surfaces for the bearing supports.

At the final joining by bonding or molding to the stator 1 provided with its windings 2 of the bearing supports 5, the lining 6 effectively prevents the bonding or molding compound 7 from penetrating into the rotor cavity 8 of the stator through the stator slots, which might otherwise obstruct the space receiving the rotor. The lining 6, inserted in the stator is made of non-magnetic material, preferably plastic. The wall thickness of this lining should be so small that it does not entail modification of the diametrical measurements of the rotor cavity of the stator, but permits the air gap between the rotor and the stator to be dimensioned without taking the lining thickness into consideration.

Figure 2:
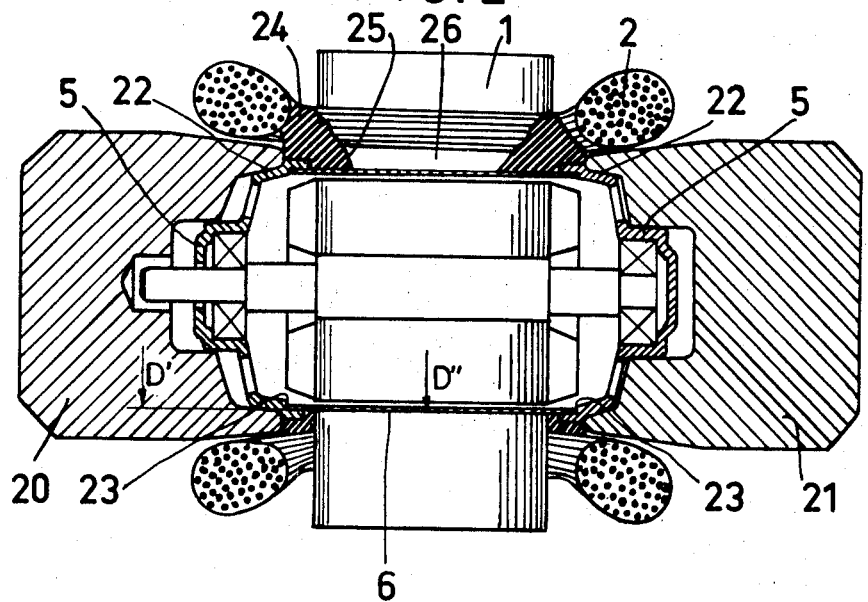
FIG. 2 illustrates a step in the manufacture of an electric motor according to the invention with use of a two-part assembly device.

FIG. 2 shows in a longitudinal section view, how an electric motor as illustrated in FIG. 1 can be assembled with the aid of a two-part assembly device 20 and 21. This device seals off effectively the bearing supports 5 at the abutment edge 22, so that any openings in the bearing supports are covered. The bearing supports are brought to bear against the end faces 23 of the lining 6. These end faces in combination with the centering areas D' form a seal between the lining and the bearing supports. In this case, the assembly device leaves the stator 1 as well as the windings 2 uncovered, so that a complete or partial bonding or molding of bearing supports, lining, stator core and windings can be effected for instance by the dripping or spraying on of resin 24. This manufacturing step can profitably be done in connection with the insulating of the windings of the motor. Such resin 25 as penetrates into the stator winding slots is prevented by the lining from reaching the air gap between stator and rotor.

Before the application of resin the motor may preferably be test-run with the rotor and bearing support in the assembled position, the assembly device being employed for maintaining the parts in this position.

Figure 3:
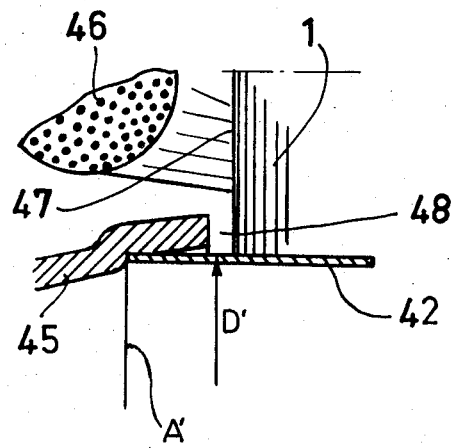
FIG. 3 is a fragmentary section view on a larger scale of the lining engaging the stator and the bearing support.

FIG. 3 shows a fragmentary section view of the stator with the lining 42, bearing support 45 and windings 46. The end portion of the lining 42 forms an axial abutment area A' and a cylindrical alignment area D' and corresponds to mating surfaces at the bearing support 45. The lining projects sufficiently far beyond the end face 47 of the stator 1 to leave a free space 48 between the bearing support and the stator. Due to its lamellated structure, the stator core shows certain recurrent deficiencies as well as dimensional variations. Thus the end face 47 may be somewhat conical, and the overall length may vary. These variations are teken up by the space 48 that is filled with bonding resin when the bearing support is attached to the stator core. Furthermore, resin can penetrate into the wedge-shaped space between the bearing support and the lining.

Figure 4:
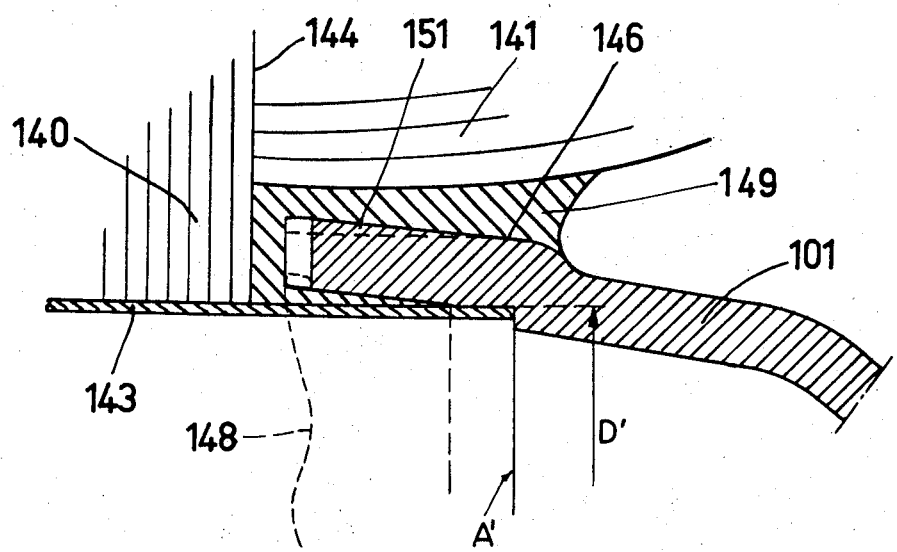
FIG. 4 is a similar fragmentary section view on a still larger scale and in greater detail.

FIG. 4 illustrates in greater detail the shape of a bearing support 101 precision-made of a sheet metal pressing in a continuous sequence of operations, and its assembling with the stator core 140 with the aid of the aligning and axially spacing lining 143, projecting somewhat outside the end face 144 of the stator core. The bearing support has a frusto-conically expanded end portion 146 formed at the inside with an annular shoulder A' for engaging the end face of the lining 143 and a cylindrical alignment surface D', which is accurately located by the mating cylindrical outer surface of the lining. The outside and the end face 148 of the end portion 146 of the bearing support form, separated from the surfaces A' and D', attachment surfaces for the rigid fixing of the bearing support to the stator core 140 by bonding resin 149 being filled into the space defined between the stator core 140 and the windings 141, the end portion of the bearing support 146 and the projecting part of the lining 143. The resin will surround and enclose the end portion of the bearing support without penetrating in between the accurately mating surfaces of this component and of the lining member. As illustrated, the end face 148 of the bearing support has assumed a wavy shape in the pressing operation. This contributes to the rigid fixing of the bearing support to the stator by the waviness increasing the resistance to torsional stresses.

For similar purpose, grooves and ridges 151 may be formed at the bonding surface of the bearing support in the pressing operation.

Figure 5:
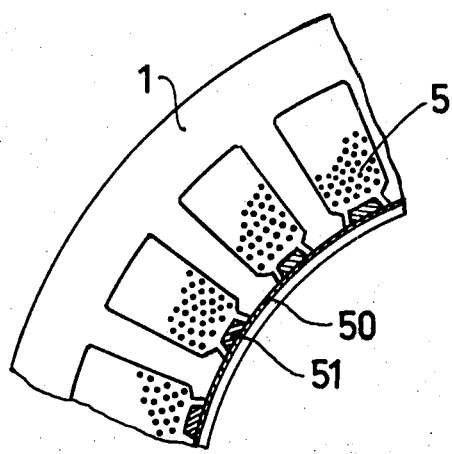
FIGS. 5 and 6 are fragmentary cross-section views of the stator core with windings and different linings.

FIG. 5 is a fragmentary section view of a stator. The lining member 50 has been provided with longitudinal stiffening ridges 51 of any suitable shape. In addition to their stiffening effect on the lining these ridges also support the wires 52 of the windings. The lining should have a close fit in the rotor cavity of the stator core. To achieve this, the effects of cooling and/or heating of components may be utilized. The measurements and tolerances of the components should be adjusted accordingly.

Figure 6:
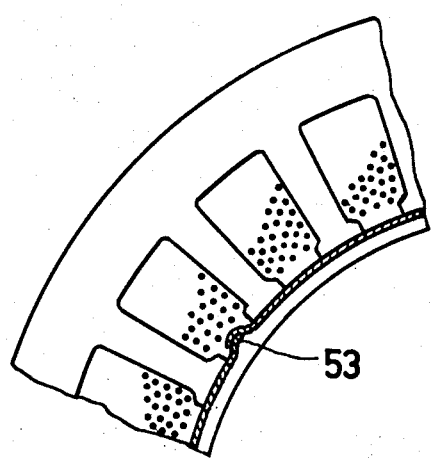

FIG. 6 shows how the lining may be made with a lengthwise joint 53. A longitudinal, overlap joint can be received in any of the slots of the stator core. Such a lining element can easily be made with great precision of sheet or strip material, rolled to cylindrical shape. The mounting into the rotor cavity of the stator can easily be carried out with the aid of an expandable device. The joint does not have to be overlapping, but could be a butt joint, and the lining may be formed with a joint that is more or less open. A bonding agent is applied, preferably at the edges of the joint, in order to obtain a secure fixation to the wall of the bore of the stator.

The lining member in the bore of the stator should be made of a non-metallic or metallic, non-magnetic material. The material must be rigid, although the wall thickness is very small, of the order of decimal fractions of a millimeter. This very slight wall thickness can be adopted thanks to the fact that the lining projects a very short distance outside the stator core, and since the function of the lining relative to the bearing support is for alignment and spacing during the fixation by bonding of the bearing support. After the fixation of the bearing support to the stator core the lining need not take up any external forces.

The lining can be shaped and attached to the stator bore in many different ways. Of essential importance is always that the lining, in its position in the stator bore, affords the necessary surfaces for aligning and axially spacing the bearing support, and further protects the rotor cavity of the stator from any bonding agent or resin penetrating through the stator windings. The lining member can be made of finished tubing or, as described above, of sheet metal having for example a joint of the overlapping or butt joing type. A butt joing can be modified in such a way that the longitudinal edges may be bent up to provide increased stiffness. The joint thus formed can be accommodated like an overlap joint in one of the stator winding slots, thus obviating any obstruction of the air gap between the stator and the rotor. A many-layered lining consisting of foil-sheet wrapped on top of each other, is possible, as well.

In the foregoing description, glue, bonding agents, resin and molding compounds have been mentioned. Any substance that is suited for the fixation of the bearing supports to the stator core through bonding or molding and preferably substances that are at the same time suited for electric isolation of the stator windings is included by these terms.

I claim:

1. An electric motor apparatus comprising a stator core having windings, a rotor, bearing support means rotatably supporting the rotor in a predetermined position relative to the stator, a thin-walled cylindrical liner of non-magnetic material disposed interiorly of said stator and extending axially beyond the axial end faces of the stator core thereby defining an alignment surface concentric with the rotor cavity of said stator and an axial abutment surface generally at substantially right angles to said rotor, said bearing support means being disposed at opposite axial ends of said liner and each bearing support means comprising a cup-shaped member attached at its outer end to the stator by means of a circumferentially extending bonding member, each of said cup-shaped members at its inner end supporting a rotor bearing means, each said cup-shaped member formed at its outer end with an abutment shoulder and a cylindrical alignment surface engageable with the axial end portion of the liner member.

2. An electric motor apparatus as claimed in claim 1, wherein the liner member is formed with an overlapping joint, and is secured to the wall of the stator bore.

3. An electric motor apparatus as claimed in claim 1, wherein the liner member has at least one longitudinal joint accommodated in a stator winding slot, said joint being a modified butt joint.

* * * * *